(12) United States Patent
Kanada et al.

(10) Patent No.: US 10,906,151 B2
(45) Date of Patent: Feb. 2, 2021

(54) METHOD OF CORRECTING TRACK OF CUTTING EDGE, RECORDING MEDIUM, AND PROGRAM

(71) Applicants: SUMITOMO ELECTRIC HARDMETAL CORP., Itami (JP); Sumitomo Electric Industries, Ltd., Osaka (JP); Sumitomo Electric Tool Net, Inc., Osaka (JP)

(72) Inventors: Yasuyuki Kanada, Itami (JP); Kunishige Tanaka, Itami (JP); Shota Takemura, Itami (JP); Soichiro Okumura, Itami (JP); Jun Okamoto, Osaka (JP); Futoshi Takeshita, Osaka (JP)

(73) Assignees: Sumitomo Electric Hardmetal Corp., Itami (JP); Sumitomo Electric Industries, Ltd., Osaka (JP); Sumitomo Electric Tool Net, Inc., Osaka (JP)

( * ) Notice: Subject to any disclaimer, the term of this patent is extended or adjusted under 35 U.S.C. 154(b) by 99 days.

(21) Appl. No.: 16/098,204

(22) PCT Filed: Apr. 27, 2017

(86) PCT No.: PCT/JP2017/016721
§ 371 (c)(1),
(2) Date: Nov. 1, 2018

(87) PCT Pub. No.: WO2017/191802
PCT Pub. Date: Nov. 9, 2017

(65) Prior Publication Data
US 2019/0152010 A1    May 23, 2019

(30) Foreign Application Priority Data
May 2, 2016   (JP) ................................ 2016-092410

(51) Int. Cl.
*B23Q 15/22*    (2006.01)
*G05B 19/404*   (2006.01)
(Continued)

(52) U.S. Cl.
CPC ............... *B23Q 15/22* (2013.01); *B23B 1/00* (2013.01); *B23C 3/16* (2013.01); *G05B 19/402* (2013.01);
(Continued)

(58) Field of Classification Search
CPC ...... B23Q 15/007; B23Q 15/12; B23Q 15/14; B23Q 15/22; B23B 1/00; B32C 3/16; G05B 19/402; G05B 19/404; G05B 2219/37506
See application file for complete search history.

(56) References Cited

U.S. PATENT DOCUMENTS

| | | | |
|---|---|---|---|
| 4,513,380 A * | 4/1985 | Spooner | G05B 19/186 409/69 |
| 5,453,674 A * | 9/1995 | Seki | G05B 19/4062 318/569 |

(Continued)

FOREIGN PATENT DOCUMENTS

| | | |
|---|---|---|
| EP | 3075473 A1 | 10/2016 |
| JP | 07-080752 A | 3/1995 |

(Continued)

*Primary Examiner* — Alan Snyder
*Assistant Examiner* — Yasir A Diab
(74) *Attorney, Agent, or Firm* — Baker Botts L.L.P.; Michael A. Sartori

(57) ABSTRACT

A method of correcting a track of a cutting edge is provided. With movement of the cutting edge, a point on the cutting edge in contact with the rotation symmetry plane is moved along the cutting edge from a first end portion of the cutting edge to a second end portion of the cutting edge opposite to the first end portion. The correction method includes measuring, by a measurement unit, a shape of the cut and machined rotation symmetry plane, calculating, by an operation unit, an error of the measured shape of the rotation symmetry plane from a target shape of the rotation symmetry plane in a direction of the axial line of rotation, and (Continued)

correcting, by the operation unit, a component in the direction of the axial line of rotation of a track of a point of cutting based on the error.

3 Claims, 10 Drawing Sheets

(51) Int. Cl.
  *B23B 1/00* (2006.01)
  *B23C 3/16* (2006.01)
  *G05B 19/402* (2006.01)
  *B23Q 15/24* (2006.01)

(52) U.S. Cl.
  CPC ............ *G05B 19/404* (2013.01); *B23Q 15/24* (2013.01); *G05B 2219/37506* (2013.01)

(56) References Cited

U.S. PATENT DOCUMENTS

| | | | | |
|---|---|---|---|---|
| 5,778,745 A | * | 7/1998 | Furusawa | B23B 25/02 82/1.11 |
| 5,910,199 A | * | 6/1999 | Busick | B23G 1/04 82/1.11 |
| 6,155,148 A | * | 12/2000 | Shinozaki | G05B 19/186 409/66 |
| 6,404,160 B2 | * | 6/2002 | Sagasaki | G05B 19/18 318/600 |
| 6,453,782 B1 | * | 9/2002 | Yamazaki | G05B 19/186 700/159 |
| 8,594,831 B2 | * | 11/2013 | Zhao | G05B 19/4097 700/159 |
| 2002/0029661 A1 | * | 3/2002 | Yamazaki | B23C 5/109 76/25.1 |
| 2003/0089204 A1 | | 5/2003 | Schreiber et al. | |
| 2005/0160887 A1 | * | 7/2005 | Erickson | B23B 27/16 82/121 |
| 2009/0326705 A1 | * | 12/2009 | Chiu | G05B 19/188 700/160 |
| 2016/0288214 A1 | * | 10/2016 | Ishihara | B23B 1/00 |
| 2016/0368060 A1 | * | 12/2016 | Ishihara | B23B 1/00 |

FOREIGN PATENT DOCUMENTS

| | | |
|---|---|---|
| JP | 2007-118100 A | 5/2007 |
| WO | 01/43902 A2 | 6/2001 |
| WO | 2015/079836 A1 | 6/2015 |
| WO | 2015/129567 A1 | 9/2015 |

* cited by examiner

METHOD OF CORRECTING TRACK OF CUTTING EDGE, RECORDING MEDIUM, AND PROGRAM

TECHNICAL FIELD

The present invention relates to a method of correcting a track of a cutting edge, a recording medium, and a program. The present application claims priority to Japanese Patent Application No. 2016-092410 filed on May 2, 2016, the entire contents of which are incorporated herein by reference.

BACKGROUND ART

International Publication No. 2001/043902 (PTL 1) discloses a method of machining a workpiece with a cutting edge. The cutting edge is set as being inclined with respect to a direction of feed and fed in a direction transverse to an axial line of rotation of the workpiece. With this machining method, a surface of the workpiece can be machined to be smooth and highly efficient machining can be achieved.

CITATION LIST

Patent Literature

PTL 1: International Publication No. 2001/043902

SUMMARY OF INVENTION

A method of correcting a track of a cutting edge according to one embodiment of the present invention is a method of correcting a track of a cutting edge for machining by cutting a rotation symmetry plane of a rotating workpiece. The cutting edge is set obliquely to an axial line of rotation of the workpiece and moved in a direction inclined with respect to the axial line of rotation while the cutting edge is in contact with the rotation symmetry plane. With movement of the cutting edge, a point on the cutting edge in contact with the rotation symmetry plane is moved along the cutting edge from a first end portion of the cutting edge to a second end portion of the cutting edge opposite to the first end portion. The method includes measuring, by a measurement unit, a shape of the cut and machined rotation symmetry plane, calculating, by an operation unit, an error of the measured shape of the rotation symmetry plane from a target shape of the rotation symmetry plane in a direction of the axial line of rotation, and correcting, by the operation unit, a component in a direction of the axial line of rotation of a track of the first end portion of the cutting edge based on the error.

A recording medium according to one embodiment of the present invention is a computer-readable recording medium having a program recorded thereon, the program causing a computer to perform a method of correcting a track of a cutting edge. The cutting edge is set obliquely to an axial line of rotation of a workpiece and moved transversely across the axial line of rotation while the cutting edge is in contact with a rotation symmetry plane. With movement of the cutting edge, a point on the cutting edge in contact with the rotation symmetry plane is moved along the cutting edge from a first end portion of the cutting edge to a second end portion of the cutting edge opposite to the first end portion. The program causes the computer to perform accepting a result of measurement by a measurement unit of a shape of the cut and machined rotation symmetry plane, calculating an error of the measured shape of the rotation symmetry plane from a target shape of the rotation symmetry plane in a direction of the axial line of rotation, and correcting a component in the direction of the axial line of rotation of a track of the first end portion of the cutting edge based on the error.

A program according to one embodiment of the present invention is a program causing a computer to perform a method of correcting a track of a cutting edge. The cutting edge is set obliquely to an axial line of rotation of a rotating workpiece and moved transversely across the axial line of rotation while the cutting edge is in contact with a rotation symmetry plane of the workpiece. With movement of the cutting edge, a point on the cutting edge in contact with the rotation symmetry plane is moved along the cutting edge from a first end portion of the cutting edge to a second end portion of the cutting edge opposite to the first end portion. The program causes the computer to perform accepting a result of measurement by a measurement unit of a shape of the cut and machined rotation symmetry plane, calculating an error of the measured shape of the rotation symmetry plane from a target shape of the rotation symmetry plane in a direction of the axial line of rotation, and correcting a component in the direction of the axial line of rotation of a track of the first end portion of the cutting edge based on the error.

DESCRIPTION OF EMBODIMENTS

Figure 1:
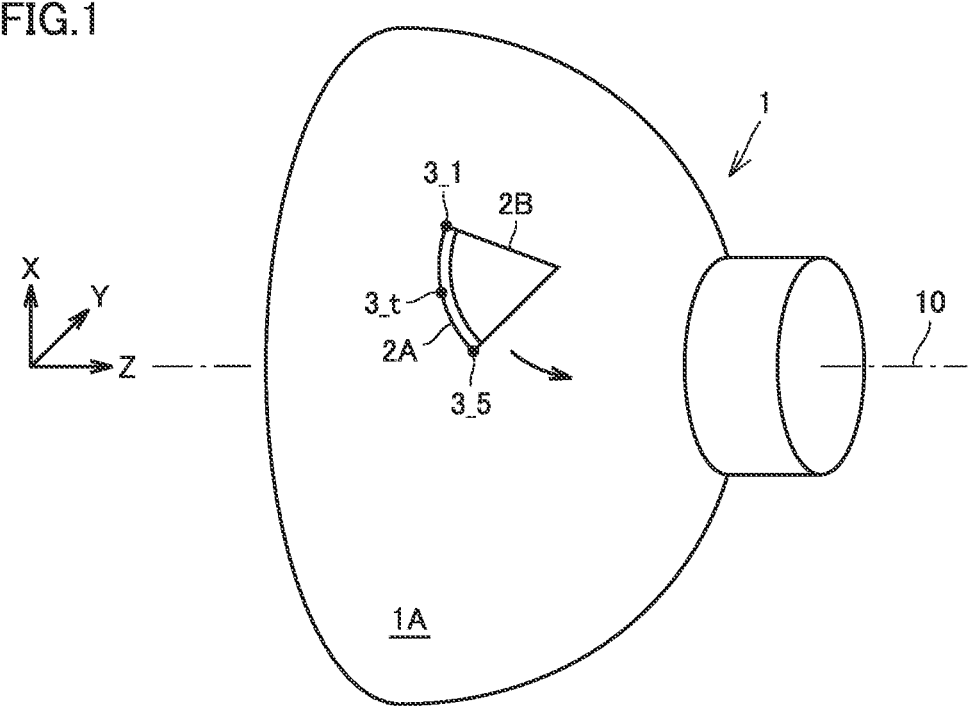
FIG. 1 is a perspective view showing a manufacturing method according to one embodiment of the present invention.

Problem to be Solved by the Present Disclosure

A shape of a machined workpiece may deviate from a target shape for various factors. One of such factors is wear of a cutting edge. In order to replace a cutting edge, however, a working machine should be stopped. From a point of view of productivity, the machine preferably continuously operates for a time period as long as possible.

An object of the present disclosure is to provide a technique for repeatedly doing highly accurate machining by cutting of a rotation symmetry plane.

Effects of Present Disclosure

According to the present disclosure, highly accurate machining by cutting of a rotation symmetry plane can repeatedly be done.

Description of Embodiments of the Present Invention

Embodiments of the present invention will initially be listed and described.

(1) A method of correcting a track of a cutting edge according to one embodiment of the present invention is a method of correcting a track of a cutting edge for machining by cutting a rotation symmetry plane of a rotating workpiece. The cutting edge is set obliquely to an axial line of rotation of the workpiece and moved in a direction inclined with respect to the axial line of rotation while the cutting edge is in contact with the rotation symmetry plane. With movement of the cutting edge, a point on the cutting edge in contact with the rotation symmetry plane is moved along the cutting edge from a first end portion of the cutting edge to a second end portion of the cutting edge opposite to the first end portion. The method includes measuring, by a measurement unit, a shape of the cut and machined rotation symmetry plane, calculating, by an operation unit, an error of the measured shape of the rotation symmetry plane from a target shape of the rotation symmetry plane in a direction of the axial line of rotation, and correcting, by the operation unit, a component in the direction of the axial line of rotation of a track of the first end portion of the cutting edge based on the error.

According to the above, as a result of correction of the track, highly accurate machining by cutting of the rotation symmetry plane can repeatedly be done.

(2) Preferably, in a three-dimensional orthogonal coordinate system in which the axial line of rotation is defined as a Z axis, an axis in a direction of a radius of rotation of the rotation symmetry plane is defined as an X axis, and an axis orthogonal to both of the Z axis and the X axis is defined as a Y axis, a track of a point of cutting before correction is expressed with a variable t as (X(t), Y(t), Z(t)), the variable varying from 0 to 1.

Relation of $R_{sh}(t) = \sqrt{(X(t)+X_{chip}(t))^2 + (Y(t)+Y_{chip}(t))^2}$ is satisfied where $R_{sh}$ represents the radius of rotation. In the calculating an error, the operation unit calculates the error as a function $\delta Z(R_{sh}(t))$ in a direction of the Z axis. In the correcting a component, the operation unit corrects the track of the first end portion to $(X(t), Y(t), Z(t) - \delta Z(R_{sh}(t)))$.

According to the above, the corrected track can be determined by finding a function $\delta Z(R_{sh}(t))$.

(3) Preferably, in the measuring a shape, the measurement unit measures an error in a direction of the axial line of rotation at at least three points on the rotation symmetry plane. In the calculating an error, the operation unit determines the function $\delta Z(R_{sh}(t))$ by interpolation based on a result of measurement of the error.

According to the above, the function $\delta Z(R_{sh}(t))$ can be determined even though the number of points of measurement of an error is made smaller.

(4) A recording medium according to one embodiment of the present invention is a computer-readable recording medium having a program recorded thereon, the program causing a computer to perform a method of correcting a track of a cutting edge. The cutting edge is set obliquely to an axial line of rotation of a workpiece and moved transversely across the axial line of rotation while the cutting edge is in contact with a rotation symmetry plane. With movement of the cutting edge, a point on the cutting edge in contact with the rotation symmetry plane is moved along the cutting edge from a first end portion of the cutting edge to a second end portion of the cutting edge opposite to the first end portion. The program causes the computer to perform accepting a result of measurement by a measurement unit of a shape of the cut and machined rotation symmetry plane, calculating an error of the measured shape of the rotation symmetry plane from a target shape of the rotation symmetry plane in a direction of the axial line of rotation, and correcting a component in the direction of the axial line of rotation of a track of the first end portion of the cutting edge based on the error.

According to the above, the computer can correct the track. Thus, highly accurate machining by cutting of the rotation symmetry plane can repeatedly be done.

(5) A program according to one embodiment of the present invention is a program causing a computer to perform a method of correcting a track of a cutting edge. The cutting edge is set obliquely to an axial line of rotation of a rotating workpiece and moved transversely across the axial line of rotation while the cutting edge is in contact with a rotation symmetry plane of the workpiece. With movement of the cutting edge, a point on the cutting edge in contact with the rotation symmetry plane is moved along the cutting edge from a first end portion of the cutting edge to a second end portion of the cutting edge opposite to the first end portion. The program causes the computer to perform accepting a result of measurement by a measurement unit of a shape of the cut and machined rotation symmetry plane, calculating an error of the measured shape of the rotation symmetry plane from a target shape of the rotation symmetry plane in a direction of the axial line of rotation, and correcting a component in the direction of the axial line of rotation of a track of the first end portion of the cutting edge based on the error.

According to the above, the computer can correct the track. Thus, highly accurate machining by cutting of the rotation symmetry plane can repeatedly be done.

Details of Embodiments of the Present Invention

Embodiments of the present invention will be described hereinafter with reference to the drawings. The same or corresponding elements in the drawings below have the same reference characters allotted and description thereof will not be repeated. For better understanding of the description, only some of constituent elements of the invention may be shown in the drawings.

FIG. 1 is a perspective view showing a manufacturing method according to one embodiment of the present invention. As shown in FIG. 1, a machine component 1 having a rotation symmetry plane (machined surface) 1A rotates around an axial line of rotation 10. Machine component 1 is a product manufactured with the manufacturing method according to one embodiment of the present invention.

FIG. 1 shows a machining step representing one step in the manufacturing method according to one embodiment of the present invention. Therefore, in the step shown in FIG. 1, machine component 1 can also be called a workpiece. The machining step includes cutting. The manufacturing method according to one embodiment of the present invention may include other steps. The manufacturing method can include, for example, a casting step, an assembly step, and an inspection step.

In the manufacturing method according to one embodiment of the present invention, feed of a cutting edge 2A is controlled in accordance with a three-dimensional orthogonal coordinate system. In FIG. 1, a Z axis corresponds to axial line of rotation 10. An X axis and a Y axis are both perpendicular to the Z axis and perpendicular to each other. The X axis can be set to a direction determining a dimension of a diameter or a radius of rotation of the rotation symmetry plane, which is also referred to as a radial direction or a direction of edge feed in cutting and machining. The Y axis is an axis orthogonal to both of the X axis and the Z axis and called, for example, a lateral direction or a direction of rotation. For example, axes defined as the X axis, the Y axis, and the Z axis in a lathe can be applied to the X axis, the Y axis, and the Z axis in the embodiment of the present invention.

In this embodiment, the direction of the Z axis is defined as a direction of feed (vertical feed) of cutting edge 2A. A negative direction of the X axis is defined as a direction of cut into machine component 1. The direction of the Y axis is defined as a direction opposite to a direction of movement of cutting edge 2A for cutting.

Cutting edge 2A is a part of a cutting insert 2B. Cutting insert 2B is attachable to and removable from a holder (tool). FIG. 1 does not show a holder. When it is not necessary to distinguish between cutting edge 2A and cutting insert 2B, both of them are collectively referred to as the "cutting edge" below.

Cutting edge 2A is fed along a track having an X-axis component, a Y-axis component, and a Z-axis component while it is in contact with machine component 1. During a period from start of cutting to end of cutting, individual regions of cutting edge 2A from a tip end 3_1 to a rear end 3_5 successively come in contact with a surface to be machined (rotation symmetry plane 1A). In FIG. 1, a point 3_t represents a position of cutting edge 2A in contact with rotation symmetry plane 1A. With movement of cutting edge 2A, point 3_t moves from tip end 3_1 to rear end 3_5. Rotation symmetry plane 1A is thus cut and machined.

A type of rotation symmetry plane 1A is not particularly limited in the embodiment of the present invention. Rotation symmetry plane 1A can be determined by a line which rotates around axial line of rotation 10. This line is called a "generating line" in the present embodiment. In a cross-section of machine component 1 including axial line of rotation 10, the generating line corresponds to a line expressing a portion corresponding to rotation symmetry plane 1A.

The generating line of rotation symmetry plane 1A may be linear. In other words, rotation symmetry plane 1A may be a side surface of a column or a surface of a frustum. A rotation symmetry plane of which generating line is linear like the surface of the frustum or the side surface of the column is referred to as a "linear rotation plane" below.

Alternatively, the generating line of rotation symmetry plane 1A may be any curve including an arc. FIG. 1 and figures explained below show examples in which the generating line of the rotation symmetry plane is curved. The rotation symmetry plane of which generating line is any curve including an arc is referred to as a "curved rotation plane" below.

A type of machine component 1 is not particularly limited. In one embodiment, machine component 1 is a component in a drive system of a car. For example, a pulley for constructing a continuously variable transmission represents machine component 1.

Figure 2:
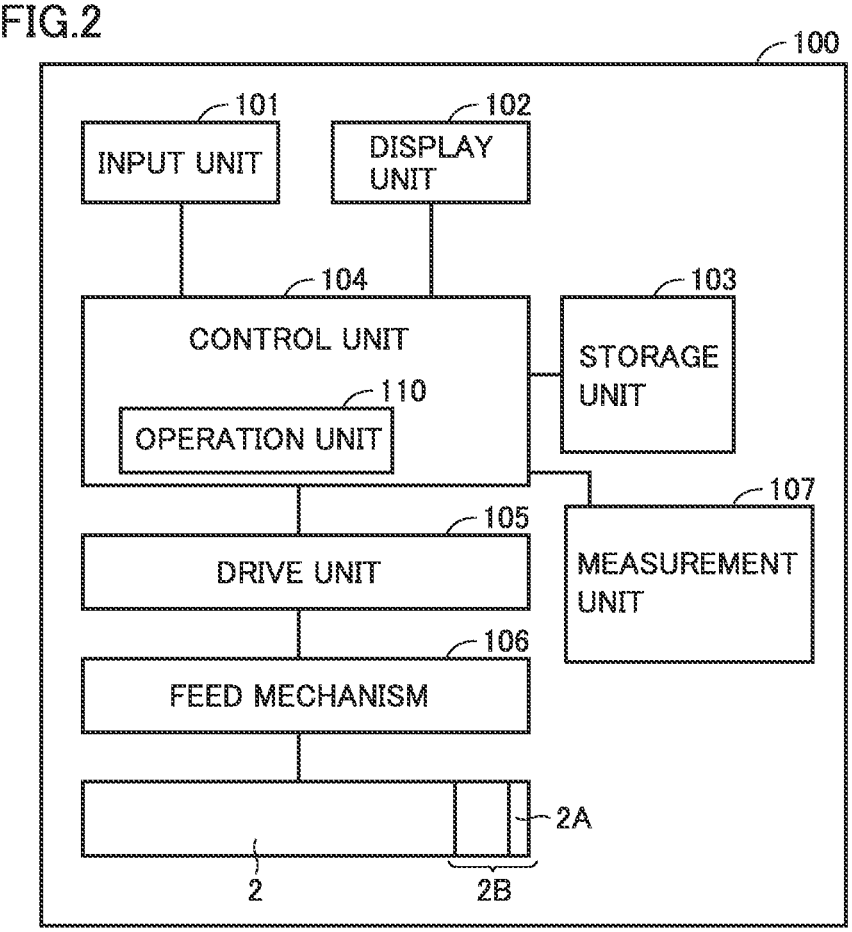
FIG. 2 is a block diagram schematically showing a configuration of a manufacturing apparatus according to one embodiment of the present invention.

FIG. 2 is a block diagram schematically showing a configuration of a manufacturing apparatus according to one embodiment of the present invention. A manufacturing apparatus 100 according to one embodiment of the present invention can be implemented, for example, by a computer numerical control (CNC) lathe. As shown in FIG. 2, manufacturing apparatus 100 includes an input unit 101, a display unit 102, a storage unit 103, a control unit 104, a drive unit 105, a feed mechanism 106, a measurement unit 107, holder 2, and cutting insert 2B having cutting edge 2A.

Input unit 101 is operated by a user. Input unit 101 accepts information from the user and sends the information to control unit 104. The information from the user includes information on a program selected by the user, various types of data necessary for manufacturing machine component 1 (machining of a rotation symmetry plane), and a command from the user.

Display unit 102 shows characters, signs, and graphics. Display unit 102 can show information accepted by input unit 101 and a result of operation by control unit 104.

Storage unit 103 stores information accepted by input unit 101 and a program for manufacturing machine component 1. The program includes a program for machining a rotation symmetry plane and a program for correcting a track of the cutting edge. According to one embodiment, storage unit 103 is implemented by a rewritable non-volatile storage device. Therefore, storage unit 103 corresponds to a recording medium having a program recorded thereon. The program may be provided through a communication line. In this case as well, the program is stored in storage unit 103.

Control unit 104 is implemented by a computer configured to control manufacturing apparatus 100 in a centralized manner. Control unit 104 includes an operation unit 110. Operation unit 110 performs numeric operations based on information accepted by input unit 101 and information stored in storage unit 103. For example, operation unit 110 may be embodied as a result of execution of a program by a central processing unit (CPU).

Drive unit 105 drives feed mechanism 106. Drive unit 105 is controlled by control unit 104. Feed mechanism 106 is configured to be able to feed holder 2 in the direction of the X axis, the direction of the Y axis, and the direction of the Z axis. Measurement unit 107 measures a shape of cut and machined rotation symmetry plane 1A. A result of measurement by measurement unit 107 is sent to control unit 104. Control unit 104 calculates an error of the measured shape from a target shape of rotation symmetry plane 1A based on the measured shape of rotation symmetry plane 1A. Control unit 104 corrects the track of cutting edge 2A based on the calculated error.

Holder 2 holds cutting edge 2A by holding cutting insert 2B. Holder 2 is attached to feed mechanism 106. During machining of rotation symmetry plane 1A by cutting edge 2A, holder 2 is fixed to feed mechanism 106 so as not to be rotatable around an axis of rotation. Therefore, during machining of rotation symmetry plane 1A, holder 2 holds an angle of cutting edge 2A. During a period other than machining of rotation symmetry plane 1A (by way of example, during maintenance of manufacturing apparatus 100), holder 2 can rotate around the axis of rotation. Thus, maintenance of manufacturing apparatus 100 is advantageously facilitated.

Cutting edge 2A is formed by a ridgeline between a rake face and a flank of cutting insert 2B. In one embodiment of the present invention, the ridgeline is curved. Namely, cutting edge 2A is curved. In one example, cutting edge 2A is in an arc shape.

In the example shown in FIG. 1, cutting edge 2A is projecting toward rotation symmetry plane 1A. Cutting edge 2A, however, may be recessed. A shape of cutting edge 2A can be determined such that cutting edge 2A does not interfere with an already machined portion of rotation symmetry plane 1A.

In another embodiment of the present invention, cutting edge 2A may be linear. The term "linear" herein means that a shape of cutting edge 2A is linear. A shape of cutting insert 2B for implementing the linear cutting edge is not particularly limited. In one embodiment, cutting insert 2B is in a triangular shape.

According to the embodiment of the present invention, individual regions of cutting edge 2A successively come in contact with rotation symmetry plane 1A during a period from start of cutting until end of cutting regardless of a shape of cutting edge 2A. With such machining, wear is distributed over the entire cutting edge 2A. Therefore, a lifetime of cutting edge 2A can be extended.

Figure 3:
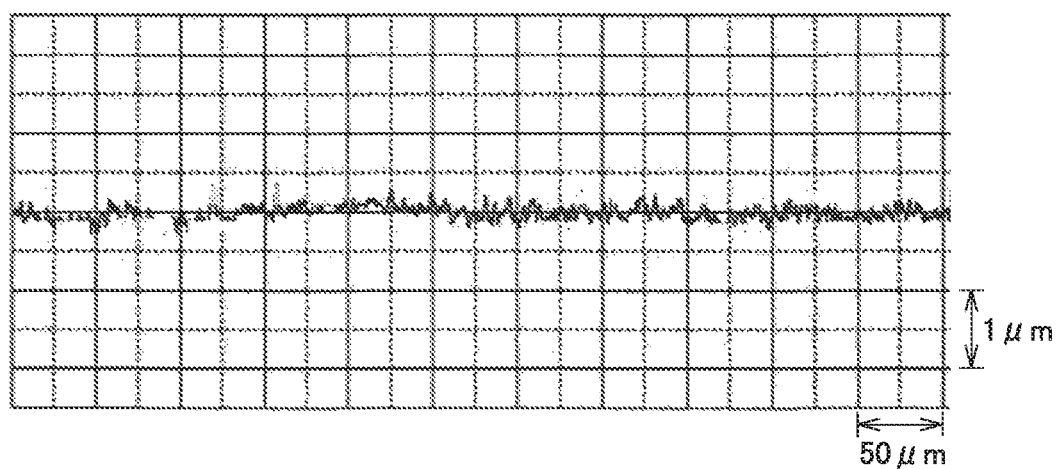
FIG. 3 is a graph showing surface roughness of a surface cut and machined in accordance with the manufacturing method according to an embodiment of the present invention.

FIG. 3 is a graph showing surface roughness of a surface cut and machined in accordance with the manufacturing method according to an embodiment of the present invention. FIG. 3 shows one example of a result of machining of a side surface of a column with linear cutting edge 2A. A cutting method of feeding the cutting edge while the same portion of the cutting edge is brought in contact with a machined surface is available (point cutting).

In point cutting, a coordinate of the cutting edge on the X axis is varied while the cutting edge is fed in the direction of the Z axis. Rotation symmetry planes in various shapes can thus be formed. Point cutting is advantageous in that a contact resistance of the cutting edge is low. A helical trace is likely to be formed in the machined surface. The manufacturing method according to the embodiment of the present invention can enhance accuracy (surface roughness) of the machined surface while a rate of feed of the cutting edge is increased, by using the entire cutting edge. Therefore, a smoother surface can be formed.

The manufacturing method according to the embodiment of the present invention, in particular, machining of a rotation symmetry plane, will be described in detail below.

1. Overview

Figure 4:
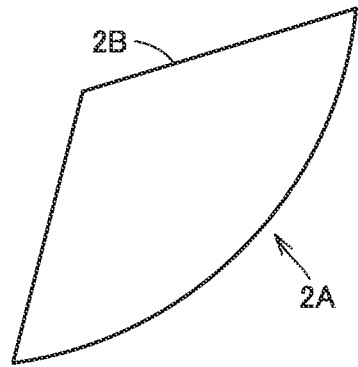
FIG. 4 is a schematic diagram showing one example of a cutting edge used in a machining method according to the embodiment of the present invention.
Figure 5:
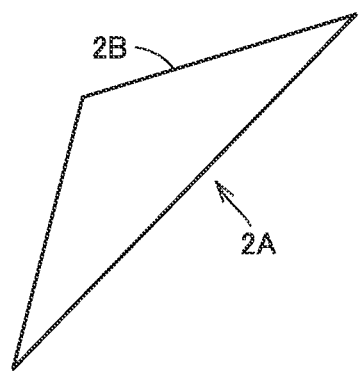
FIG. 5 is a schematic diagram showing another example of a cutting edge used in a machining method according to the embodiment of the present invention.

FIG. 4 is a schematic diagram showing one example of a cutting edge used in a machining method according to the embodiment of the present invention. FIG. 5 is a schematic diagram showing another example of a cutting edge used in a machining method according to the embodiment of the present invention.

Referring to FIGS. 4 and 5, cutting edge 2A of cutting insert 2B may be curved. Alternatively, cutting edge 2A may be linear. Rotation symmetry plane 1A is machined by using the entire cutting edge 2A in any shape. In such machining by cutting, a part of cutting edge 2A can be prevented from being significantly worn as compared with other portions. Therefore, a lifetime of the insert can be longer. Furthermore, since rotation symmetry plane 1A is machined with the entire cutting edge 2A, accuracy of the machined surface can be higher (see FIG. 3).

2. Track of Cutting Edge (1) Use of Entire Cutting Edge

A track of cutting edge 2A is expressed with an XYZ coordinate system. A direction of each of the X axis, the Y axis, and the Z axis is defined as shown in FIG. 1.

Figure 6:
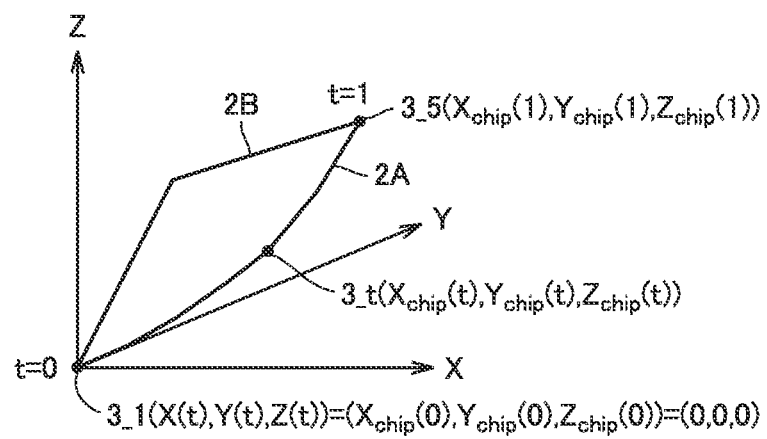
FIG. 6 is a diagram for illustrating a coordinate of a cutting edge.

FIG. 6 is a diagram for illustrating a coordinate of the cutting edge. Referring to FIG. 6, variable t is introduced. Variable t is a variable for expressing a degree of progress of cutting of a rotation symmetry plane by cutting edge 2A. Variable t is hereinafter referred to as a "cutting progress degree t." Cutting progress degree t assumes a value not smaller than 0 and not greater than 1. t=0 means start of cutting of a rotation symmetry plane. t=1 means end of cutting of the rotation symmetry plane.

A position of point 3_t is varied in accordance with cutting progress degree t. When a condition of t=0 is satisfied, point 3_t is positioned at tip end 3_1. When a condition of t=1 is satisfied, point 3_t is positioned at rear end 3_5.

A coordinate of point 3_t is expressed as $(X_{chip}(t), Y_{chip}(t), Z_{chip}(t))$. $(X_{chip}(t), Y_{chip}(t), Z_{chip}(t))$ represents a relative coordinate with a position of tip end 3_1 of cutting edge 2A being defined as the reference. During cutting and machining, rotation of cutting insert 2B is suppressed by holder 2. Therefore, while cutting progress degree t is varied from 0 to 1, a function representing each of $X_{chip}(t)$, $Y_{chip}(t)$, and $Z_{chip}(t)$ is not varied.

Figure 7:
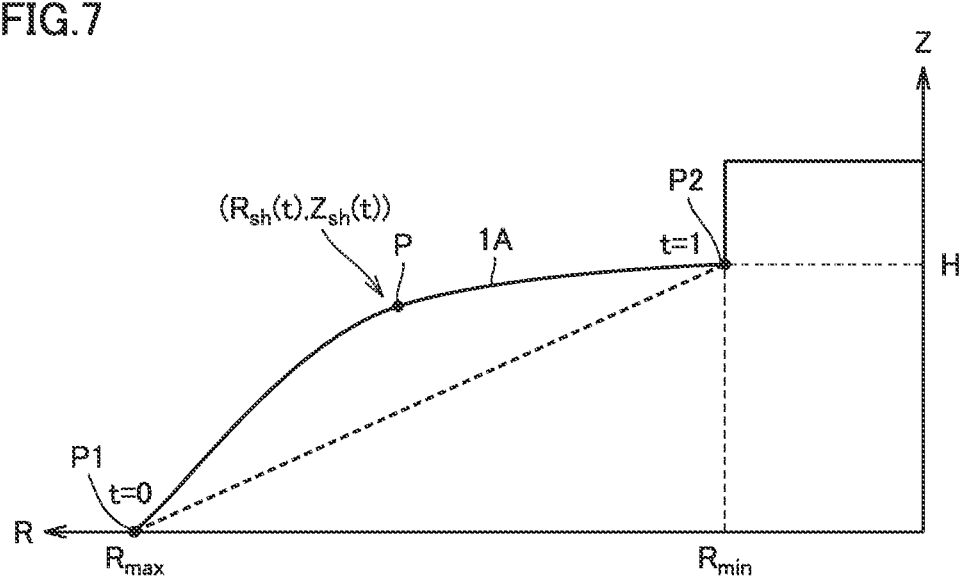
FIG. 7 is a diagram for illustrating a rotation symmetry plane machined with the cutting edge.

FIG. 7 is a diagram for illustrating the rotation symmetry plane machined with the cutting edge. Referring to FIG. 7, an R axis is an axis in a direction of a radius of rotation of the rotation symmetry plane. The R axis is orthogonal to the Z axis. As shown in FIG. 7, rotation symmetry plane 1A is expressed with a line on an RZ plane. This line may be any of a straight line and a curve depending on rotation symmetry plane 1A.

In the embodiment of the present invention, cutting and machining is performed from an outer end of rotation symmetry plane 1A toward an inner end of rotation symmetry plane 1A. With movement of cutting edge 2A, a position of a point of cutting P on rotation symmetry plane 1A in contact with cutting edge 2A is varied. Therefore, a coordinate of point of cutting P can be expressed as a function dependent on cutting progress degree t.

A coordinate of point of cutting P is expressed as $(R_{sh}(t), Z_{sh}(t))$. $R_{sh}(t)$ represents a radius of rotation of rotation symmetry plane 1A corresponding to a distance from the center of rotation on the Z axis to point of cutting P. $Z_{sh}(t)$ represents a Z-axis coordinate of the center of rotation. Function $R_{sh}(t)$ and function $Z_{sh}(t)$ can properly be determined in accordance with rotation symmetry planes of various shapes.

When a condition of t=0 is satisfied, point of cutting P is positioned at a cutting start position P1. A radius of the rotation symmetry plane at cutting start position P1 is denoted as $R_{max}$. The Z-axis coordinate of cutting start position P1 is defined as 0. Namely, a condition of ($R_{sh}(0)$, $Z_{sh}(0)$)=($R_{max}$, 0) is satisfied. $R_{max}$ assumes a predetermined value.

When a condition of t=1 is satisfied, point of cutting P is positioned at a cutting end position P2. A radius of the rotation symmetry plane at cutting end position P2 is denoted as $R_{min}$. A Z-axis coordinate of cutting start position P1 is denoted as H. Namely, a condition of ($R_{sh}(1)$, $Z_{sh}(1)$)= ($R_{min}$, H) is satisfied. $R_{min}$ and H both assume a predetermined value.

Figure 8:
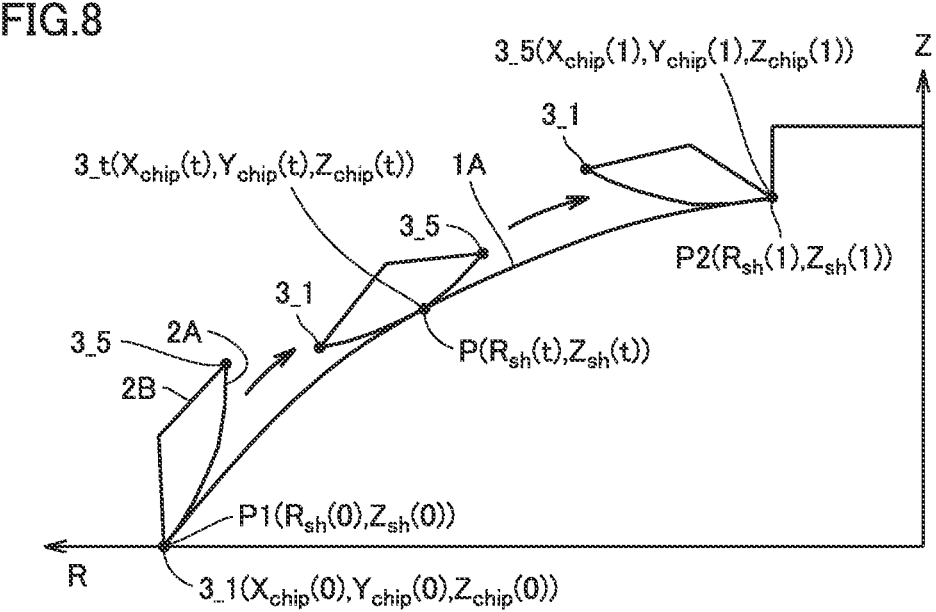
FIG. 8 is a diagram showing the cutting edge which moves as being in contact with the rotation symmetry plane.

FIG. 8 is a diagram showing the cutting edge which moves as being in contact with the rotation symmetry plane. As shown in FIG. 8, cutting edge 2A is fed while it is in contact with point of cutting P of rotation symmetry plane 1A.

When a condition of t=0 is satisfied, tip end 3_1 (first end portion) of cutting edge 2A is positioned at cutting start position P1 of rotation symmetry plane 1A. A position of point 3_t on cutting edge 2A is the same as the position of tip end 3_1 of cutting edge 2A.

When a condition of t=1 is satisfied, rear end 3_5 (second end portion) of cutting edge 2A is positioned at cutting end position P2. A position of point 3_t on cutting edge 2A is the same as the position of rear end 3_5 (second end portion) of cutting edge 2A.

As shown in FIGS. 6 and 8, a coordinate of tip end 3_1 of cutting edge 2A when the condition of t=0 is satisfied can be expressed as ($X_{chip}(0)$, $Y_{chip}(0)$, $Z_{chip}(0)$). On the track of cutting edge 2A, ($X_{chip}(0)$, $Y_{chip}(0)$, $Z_{chip}(0)$) is defined as the origin of the XYZ coordinate system. A coordinate of cutting start position P1 is expressed as ($R_{sh}(0)$, $Z_{sh}(0)$).

A coordinate of rear end 3_5 of cutting edge 2A when the condition of t=1 is satisfied can be expressed as ($X_{chip}(1)$, $Y_{chip}(1)$, $Z_{chip}(1)$). A coordinate of cutting end position P2 is expressed as ($R_{sh}(1)$, $Z_{sh}(1)$).

Generally, the coordinate of point 3_t on cutting edge 2A is expressed as ($X(t)$, $Y(t)$, $Z(t)$). When the condition of t=0 is satisfied, a condition of ($X(0)$, $Y(0)$, $Z(0)$)=($X_{chip}(0)$, $Y_{chip}(0)$, $Z_{chip}(0)$)=(0, 0, 0) is satisfied. A coordinate of point 3_t on cutting edge 2A is expressed as ($X_{chip}(t)$, $Y_{chip}(t)$, $Z_{chip}(t)$).

Cutting edge 2A is in contact with point of cutting P on rotation symmetry plane 1A at point 3_t. The coordinate of point of cutting P is expressed as ($R_{sh}(t)$, $Z_{sh}(t)$). $Z_{chip}(t)$ and $Z_{sh}(t)$, however, are different from each other. The reason is that Z-axis coordinate $Z_{chip}(t)$ of point 3_t is expressed as a relative coordinate, with a Z coordinate of tip end 3_1 of cutting edge 2A being defined as the reference.

(2) Condition for Machining of Rotation Symmetry Plane

Figure 9:
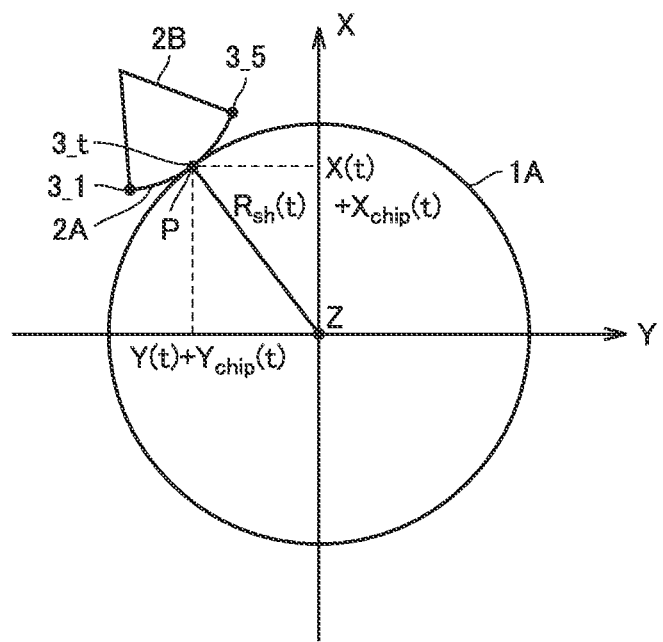
FIG. 9 is a model diagram in which the rotation symmetry plane and the cutting edge are expressed on an XY plane.

FIG. 9 is a model diagram in which rotation symmetry plane 1A and cutting edge 2A are expressed on an XY plane. In FIG. 9, the XY plane is a plane including point of cutting P. An X coordinate and a Y coordinate of tip end 3_1 of cutting edge 2A is expressed as ($X(t)$, $Y(t)$). A position of point 3_t on cutting edge 2A is different from the position of tip end 3_1 by ($X_{chip}(t)$, $Y_{chip}(0)$). Therefore, the X coordinate and the Y coordinate of point 3_t on cutting edge 2A are expressed as ($X(t)+X_{chip}(t)$, $Y(t)+Y_{chip}(0)$).

As shown in FIG. 9, a distance from the origin of the XY plane (that is, a point on the Z axis) to point of cutting P is expressed as $R_{sh}(t)$. An X coordinate and a Y coordinate of point of cutting P match with the X coordinate and the Y coordinate ($X(t)+X_{chip}(t)$, $Y(t)+Y_{chip}(0)$) of point 3_t on cutting edge 2A. Therefore, relation shown in an expression (1) below is satisfied.

$$\sqrt{(X(t)+X_{chip}(t))^2+(Y(t)+Y_{chip}(t))^2}=R_{sh}(t) \quad (1)$$

Figure 10:
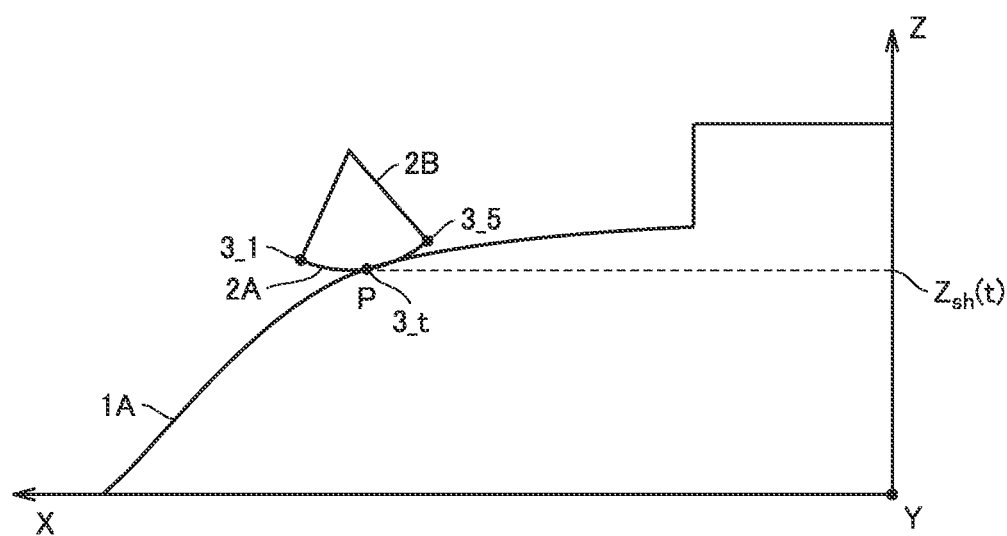
FIG. 10 is a model diagram in which the rotation symmetry plane and the cutting edge are expressed on an XZ plane.

FIG. 10 is a model diagram in which rotation symmetry plane 1A and cutting edge 2A are expressed on an XZ plane. In FIG. 10, the XZ plane is a plane including point of cutting P. A Z coordinate of tip end 3_1 of cutting edge 2A is expressed as $Z(t)$. The Z coordinate of point 3_t on cutting edge 2A is different from the Z coordinate of tip end 3_1 by $Z_{chip}(t)$. Therefore, the Z coordinate of point 3_t is expressed as $Z(t)+Z_{chip}(t)$.

As shown in FIG. 10, a distance from the origin of the XZ plane (that is, a point on the Y axis) to point of cutting P is expressed as $Z_{sh}(t)$. A Z coordinate of point of cutting P matches with the Z coordinate ($Z_{sh}(t)$) of point 3_t on cutting edge 2A. Therefore, relation shown in an expression (2) below is satisfied.

$$Z(t)+Z_{chip}(t)=Z_{sh}(t) \quad (2)$$

By varying t from t=0 to t=1 such that the expressions (1) and (2) above hold, a track of point 3_t is determined. Ideally, rotation symmetry plane 1A can be machined to an aimed shape by feeding cutting edge 2A along this track. A shape of cut and machined rotation symmetry plane 1A, however, may deviate from the target shape, for example, for such a factor as wear of cutting edge 2A.

In the embodiment of the present invention, the track of cutting edge 2A is corrected based on deviation between the shape of the cut and machined rotation symmetry plane 1A and the target shape. Deviation between the shape of cut and machined rotation symmetry plane 1A and the target shape is fed back to a track of cutting edge 2A in next machining by cutting. Highly accurate machining by cutting can thus continuously be done.

(3) Method of Correcting Track

Figure 11:
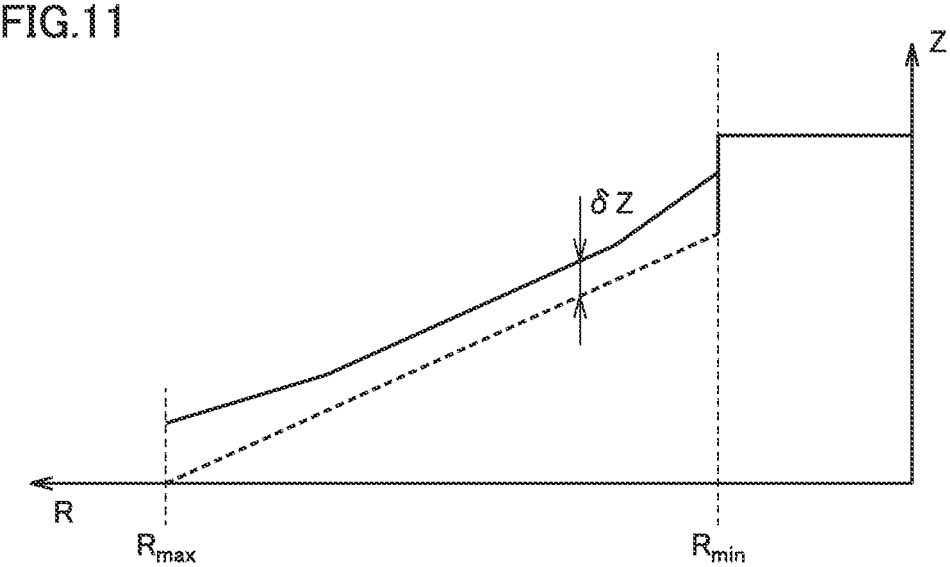
FIG. 11 is a schematic diagram showing deviation between a shape of a machined rotation symmetry plane and a target shape.
Figure 12:
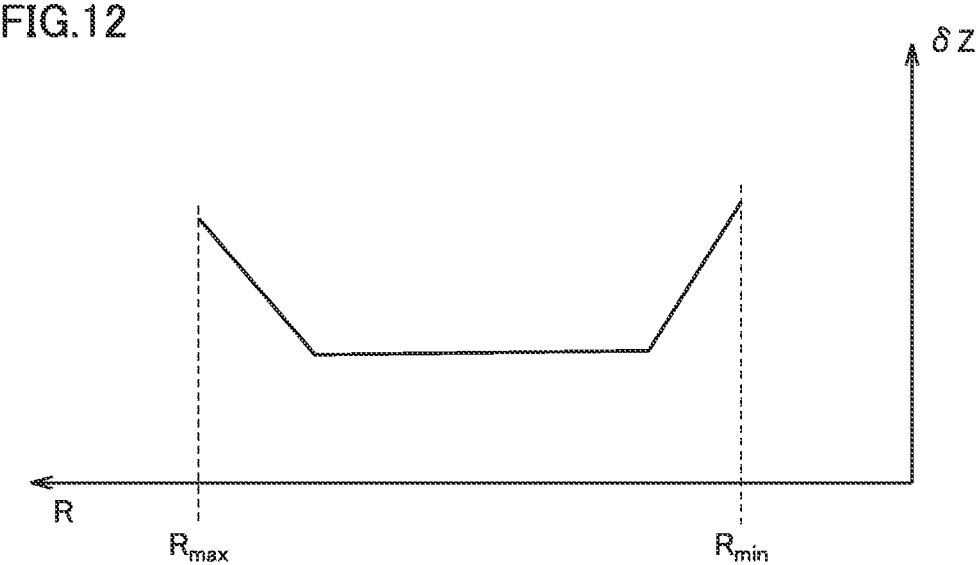
FIG. 12 is a diagram showing one example of relation between deviation in a direction of a Z axis shown in FIG. 11 and a radius.

FIG. 11 is a schematic diagram showing deviation between a shape of machined rotation symmetry plane 1A and a target shape. Referring to FIG. 11, $\delta Z$ represents deviation of a dimension in the direction of the Z axis between the shape of machined rotation symmetry plane 1A and the target shape. FIG. 12 is a diagram showing one example of relation between deviation $\delta Z$ in the direction of the Z axis shown in FIG. 11 and a radius R. As shown in FIG. 12, $\delta Z$ varies with variation in R from $R_{max}$ to $R_{min}$. Therefore, $\delta Z$ can be expressed as a function of R. Radius R varies with t. Therefore, this function is expressed as $R_{sh}(t)$.

In the example shown in FIG. 12, $\delta Z$ is always positive in a range from $R_{max}$ to $R_{min}$. $\delta Z$, however, may also always be negative in the range from $R_{max}$ to $R_{min}$. Alternatively, $\delta Z$ may also vary between a positive value and a negative value in the range from $R_{max}$ to $R_{min}$.

A dimension in the direction of the Z axis is measured at any point on machined rotation symmetry plane 1A. A target dimension in the direction of the Z axis is found from an X-axis coordinate of that point (which may be a Y-axis coordinate). $\delta Z$ represents a difference between a measured value of the dimension in the direction of the Z axis and the target dimension.

A method of measuring a dimension in the direction of the Z axis is not particularly limited. For example, various known measurement methods can be used such as a measurement method with a probe or an optical measurement method.

From a point of view of accurate expression of the function $\delta Z(R_{sh}(t))$, the number of points for measurement of a dimension along the Z axis is preferably as large as possible. As the number of points increases, however, time required for measurement of the dimension is longer. Therefore, efficiency in machining by cutting may lower. The number of points for measuring a dimension in the direction of the Z axis can be determined, for example, from a point of view of a function for expressing $\delta Z(R_{sh}(t))$ and efficiency in machining by cutting.

In one embodiment, $\delta Z$ may be found at three points of a cutting start point, a cutting end point, and a point located intermediate between the cutting start point and the cutting end point. The function $\delta Z(R_{sh}(t))$ can be obtained from a measurement value of $\delta Z$ by various interpolation (linear interpolation and spline interpolation) or approximation methods. $\delta Z$ may be found at more than three points.

In the embodiment of the present invention, a position of point 3_t on cutting edge 2A varies during a period from start of cutting until end of cutting. In next machining by cutting, a position of point 3_t is corrected by $-\delta Z(R_{sh}(t))$. Namely, a Z-axis component of the track of cutting edge 2A is corrected by $-\delta Z(R_{sh}(t))$. A cut shape can thus be corrected. A corrected coordinate of tip end 3_1 of cutting edge 2A is expressed in accordance with expressions (3) and (4) below.

$$(X(t), Y(t), Z(t) - \delta Z(R_{sh}(t))) \quad (3)$$

$$R_{sh}(t) = \sqrt{(X(t) + X_{\text{chip}}(t))^2 + (Y(t) + Y_{\text{chip}}(t))^2} \quad (4)$$

Since a position of a point of cutting of the cutting edge does not vary in point cutting, the track can be corrected simply by correcting a Z-axis component of the track. Though machining by cutting is done by using the entire cutting edge 2A in the embodiment of the present invention, a Z-axis component of the track of tip end 3_1 (first end portion) of cutting edge 2A should only be corrected as in point cutting. Deviation of a machined shape from the target shape can thus be corrected.

According to the present embodiment, deviation can gradually be lessened by repeating correction. Therefore, accuracy in machining (dimension accuracy) can further be enhanced by repeating machining by cutting.

3. Manufacturing Method

Figure 13:
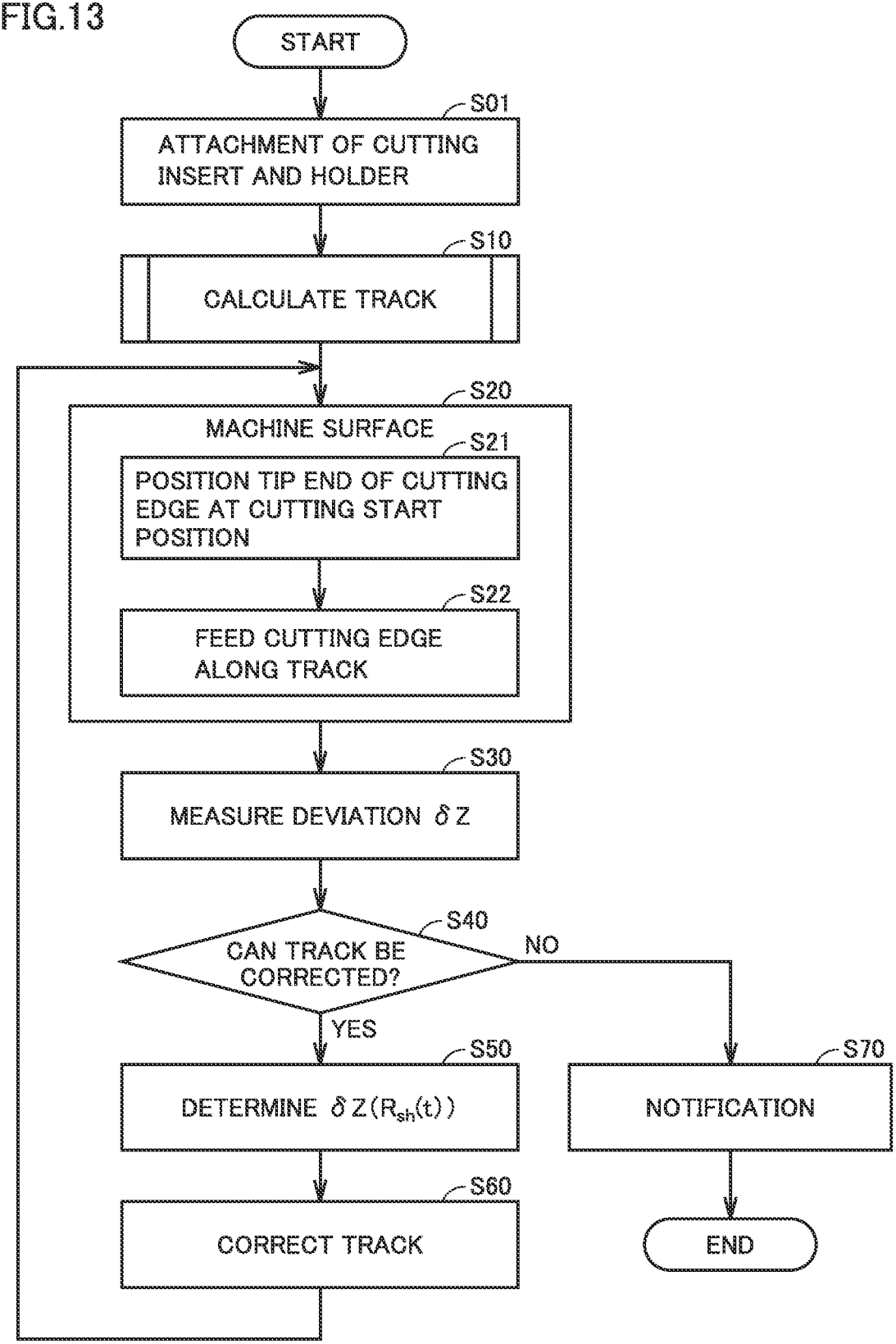
FIG. 13 is a flowchart showing a method of manufacturing a machine component including a correction method according to the embodiment of the present invention.

FIG. 13 is a flowchart showing a method for manufacturing a machine component including a correction method according to the embodiment of the present invention. Processing described below is performed as control unit 104 reads a program stored in storage unit 103. As shown in FIG. 13, in step S01, cutting insert 2B is attached to holder 2. Holder 2 is attached to manufacturing apparatus 100 (feed mechanism 106).

In step S10, a track of tip end 3_1 (first end portion) of cutting edge 2A is calculated. In step S20, cutting edge 2A machines rotation symmetry plane 1A.

Processing in step S20 will be described in detail. Initially, control unit 104 positions tip end 3_1 of cutting edge 2A at a cutting start position (step S21). Then, control unit 104 feeds cutting edge 2A such that tip end 3_1 of cutting edge 2A follows the track (the track before correction) calculated in the processing in step S10 (step S22).

In step S22, control unit 104 varies variable t (cutting progress degree) from 0 to 1. Each time t is varied, control unit 104 moves cutting edge 2A such that the coordinate of tip end 3_1 of cutting edge 2A is equal to the coordinate calculated in step S10.

In step S30, deviation between the shape of machined rotation symmetry plane 1A and the target shape, that is, $\delta Z$, is determined.

In step S40, control unit 104 determines whether or not the track of cutting edge 2A can be corrected based on a value of $\delta Z$. For example, the upper limit value of $\delta Z$ up to which the track can be corrected is determined in advance. When an absolute value of $\delta Z$ is smaller than the upper limit value, control unit 104 determines that the track can be corrected. In this case (YES in step S40), the process proceeds to step S50.

In step S50, control unit 104 determines the function $\delta Z(R_{sh}(t))$ based on a measurement value of $\delta Z$.

In step S60, control unit 104 corrects the track of tip end 3_1 of cutting edge 2A with the function $\delta Z(R_{sh}(t))$ (see the expressions (3) and (4)). When the processing in step S60 ends, the process returns to step S20. Namely, next machining by cutting is performed.

When the absolute value of $\delta Z$ exceeds the upper limit value, control unit 104 determines that the track cannot be corrected. In this case (NO in step S40), control unit 104 performs processing for giving a notification to a user (step S70). A notification method is not particularly limited. In this case, the process ends without performing next machining by cutting. For example, when cutting edge 2A should be replaced, the process is started again from step S01.

Limitation to such processing that step S20 shown in FIG. 13 is performed in succession to step S10 is not intended. Processing for calculating a track in step S10 may be performed independently of processing in step S20.

4. Example of Machining by Cutting

Figure 14:
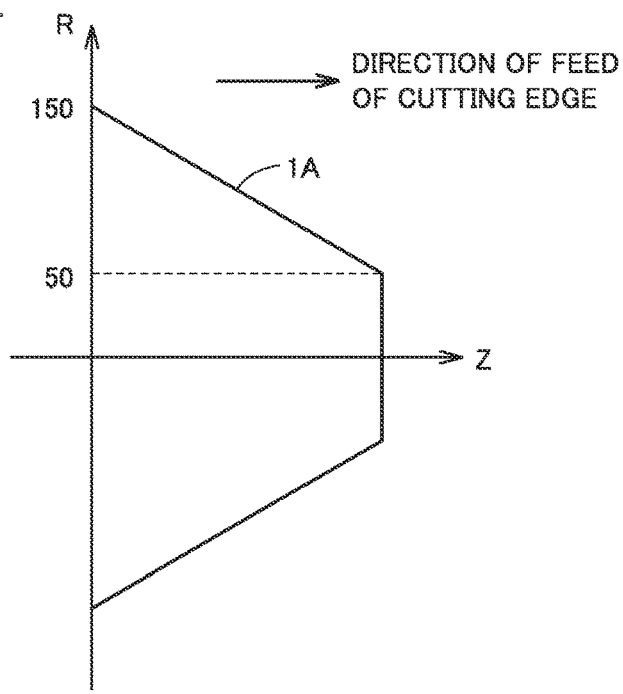
FIG. 14 is a diagram showing one example of the rotation symmetry plane to which machining by cutting according to the embodiment of the present invention is applied.

FIG. 14 is a diagram showing one example of a rotation symmetry plane to which machining by cutting according to the embodiment of the present invention is applied. Referring to FIG. 14, a side surface of a frustum is defined as rotation symmetry plane 1A. Radius R of rotation symmetry plane 1A linearly varies from R=150 [mm] to R=50 [mm] along the direction of the Z axis.

Machining by Cutting with Linear Cutting Edge

Figure 15:
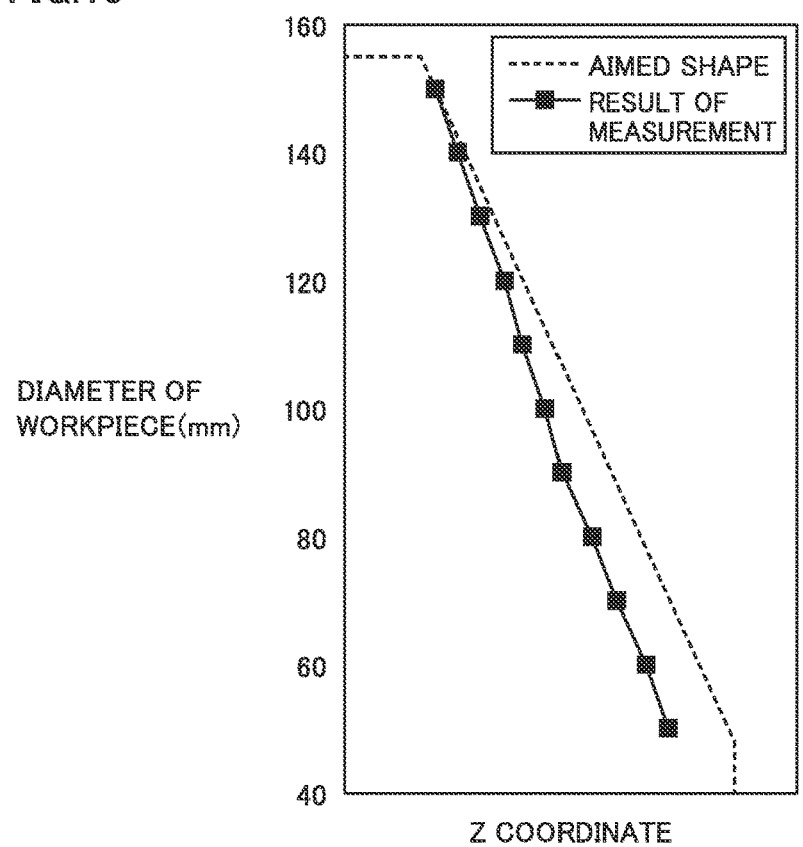
FIG. 15 is a diagram showing a cut shape when a linear cutting edge is moved along a track before correction.
Figure 16:
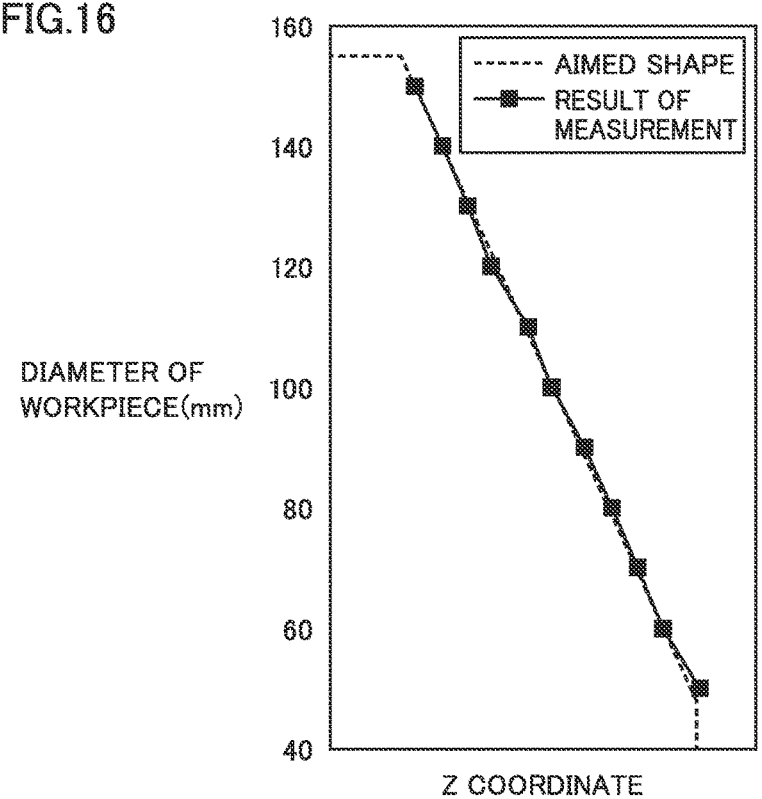
FIG. 16 is a diagram showing a cut shape when the linear cutting edge is moved along a corrected track.

FIG. 15 is a diagram showing a cut shape when a linear cutting edge is moved along a track before correction. FIG. 16 is a diagram showing a cut shape when the linear cutting edge is moved along a corrected track. An "aimed shape" means a target shape.

Referring to FIGS. 15 and 16, a result of measurement of a dimension in a direction of a Z coordinate at eleven points on rotation symmetry plane 1A is shown. Before correction of the track, with movement of cutting edge 2A in the direction of the Z axis, a value of $\delta Z$ increased in a negative direction. This result indicates that, when cutting edge 2A was moved along the track before correction, the rotation symmetry plane was cut away excessively as compared with the target shape. The absolute value of $\delta Z$ was maximum at a position of $R=R_{min}$ (R=50 [mm]) ($\delta Z=-0.025$ mm).

New rotation symmetry plane 1A was cut and machined after correction of the track. $\delta Z$ was $-0.003$ mm at a position of R=120 [mm] and $\delta Z$ was 0.004 [mm] at a position of R=50 [mm]. It could be confirmed that accuracy in machining was enhanced by correcting the track.

Figure 17:
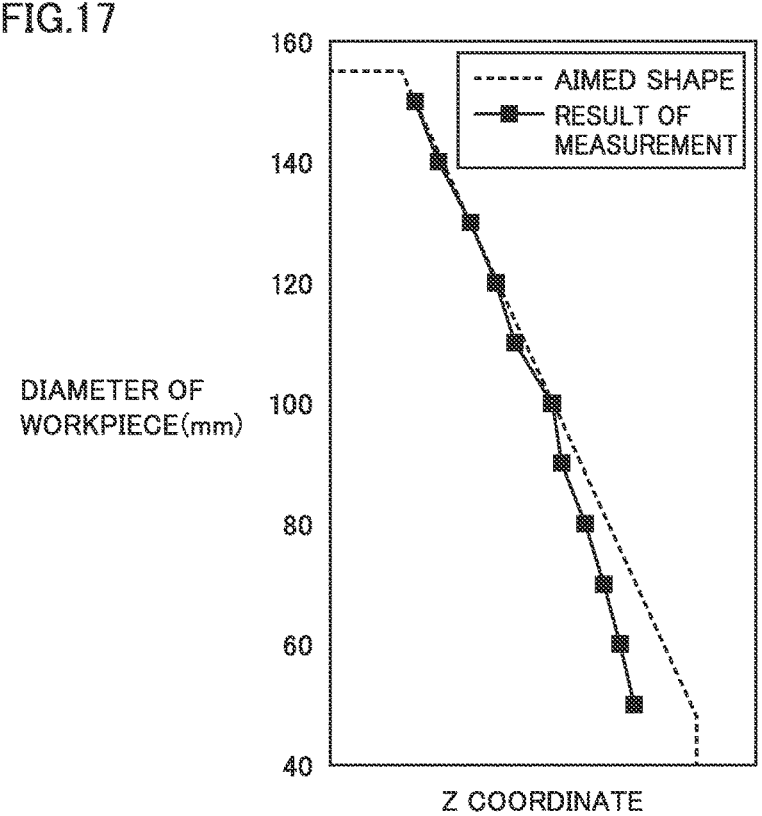
FIG. 17 is a diagram showing a cut shape when a curved cutting edge is moved along a track before correction.
Figure 18:
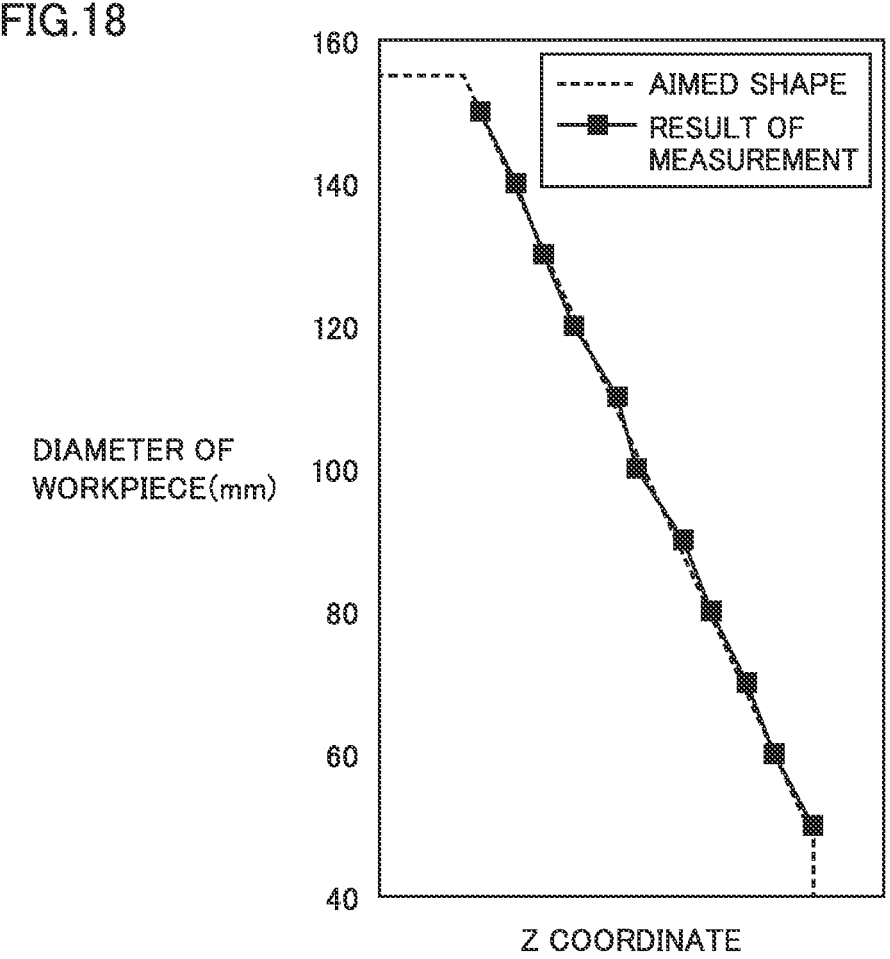
FIG. 18 is a diagram showing a cut shape when the curved cutting edge is moved along a corrected track.

FIG. 17 is a diagram showing a cut shape when a curved cutting edge is moved along a track before correction. FIG. 18 is a diagram showing a cut shape when the curved cutting edge is moved along a corrected track. A radius of curvature of the cutting edge was set to 150 mm. As in the examples shown in FIGS. 15 and 16, a result of measurement of a dimension in the direction of the Z axis at eleven points on rotation symmetry plane 1A is shown.

Referring to FIGS. 17 and 18, before correction of the track, with movement of cutting edge 2A in the direction of the Z axis, a value of $\delta Z$ increased in the negative direction. An absolute value of $\delta Z$ was maximum at a position of $R=R_{min}$ (R=50 [mm]) ($\delta Z=-0.025$ mm). After correction of the track, $\delta Z$ was 0.003 mm at a position of R=90 [mm] and δZ was −0.003 [mm] at a position of R=100 [mm]. It could be confirmed that accuracy in machining was enhanced by correcting the track.

As shown in FIGS. 16 and 18, according to the embodiment of the present invention, regardless of a shape of the cutting edge, accuracy in machining can be improved by correcting the track. Since the track can be corrected each time the rotation symmetry plane is cut and machined, highly accurate machining by cutting of the rotation symmetry plane can repeatedly be done.

It should be understood that the embodiment disclosed herein is illustrative and non-restrictive in every respect. The scope of the present invention is defined by the terms of the claims, rather than the embodiment above, and is intended to include any modifications within the scope and meaning equivalent to the terms of the claims.

REFERENCE SIGNS LIST 1 machine component; 1A rotation symmetry plane; 2 holder; 2A cutting edge; 2B cutting insert; 3_1 tip end (cutting edge); 3_5 rear end (cutting edge); 3_t point (cutting edge); 10 axial line of rotation; 100 manufacturing apparatus; 101 input unit; 102 display unit; 103 storage unit; 104 control unit; 105 drive unit; 106 mechanism; 107 measurement unit; 110 operation unit; P point of cutting; P1 cutting start position; P2 cutting end position; and S01, S10, S20, S21, S22, S30, S40, S50, S60, S70 step

The invention claimed is:

1. A method of correcting a track of a cutting edge for machining by cutting a rotation symmetry plane of a rotating workpiece, the cutting edge being set obliquely to an axial line of rotation of the workpiece and moved in a direction inclined with respect to the axial line of rotation while the cutting edge is in contact with the rotation symmetry plane, with movement of the cutting edge, a point on the cutting edge in contact with the rotation symmetry plane being moved along the cutting edge from a first end portion of the cutting edge to a second end portion of the cutting edge opposite to the first end portion, the method comprising:
   measuring, by a measurement unit, a shape of the cut and machined rotation symmetry plane;
   calculating, by an operation unit, an error of the measured shape of the rotation symmetry plane from a target shape of the rotation symmetry plane in a direction of the axial line of rotation; and
   correcting, by the operation unit, a component in the direction of the axial line of rotation of the first end portion of the cutting edge based on the error.

2. The method of correcting a track of a cutting edge according to claim 1, wherein
   in a three-dimensional orthogonal coordinate system in which the axial line of rotation is defined as a Z axis, an axis in a direction of a radius of rotation of the rotation symmetry plane is defined as an X axis, and an axis orthogonal to both of the Z axis and the X axis is defined as a Y axis,
   a track of the first end portion of the cutting edge before correction is expressed with a variable t as (X(t), Y(t), Z(t)), the variable varying from 0 to 1,
   relation of $R_{sh}(t)=\sqrt{(X(t)+X_{chip}(t))^2+(Y(t)+Y_{chip}(t))^2}$ is satisfied, where $R_{sh}$ represents the radius of rotation,
   in the calculating an error, the operation unit calculates the error as a function $\delta Z(R_{sh}(t))$ in a direction of the Z axis, and
   in the correcting a component, the operation unit corrects the track of the first end portion to (X(t), Y(t), Z(t)−$\delta Z(R_{sh}(t))$).

3. The method of correcting a track of a cutting edge according to claim 2, wherein
   in the measuring a shape, the measurement unit measures an error in the direction of the axial line of rotation at at least three points on the rotation symmetry plane, and
   in the calculating an error, the operation unit determines the function $\delta Z(R_{sh}(t))$ by interpolation based on a result of measurement of the error.

* * * * *